Sept. 30, 1969   E. M. MOFFATT   3,469,445
GAS FLOW MEASURING SYSTEM
Filed July 20, 1967   2 Sheets-Sheet 1
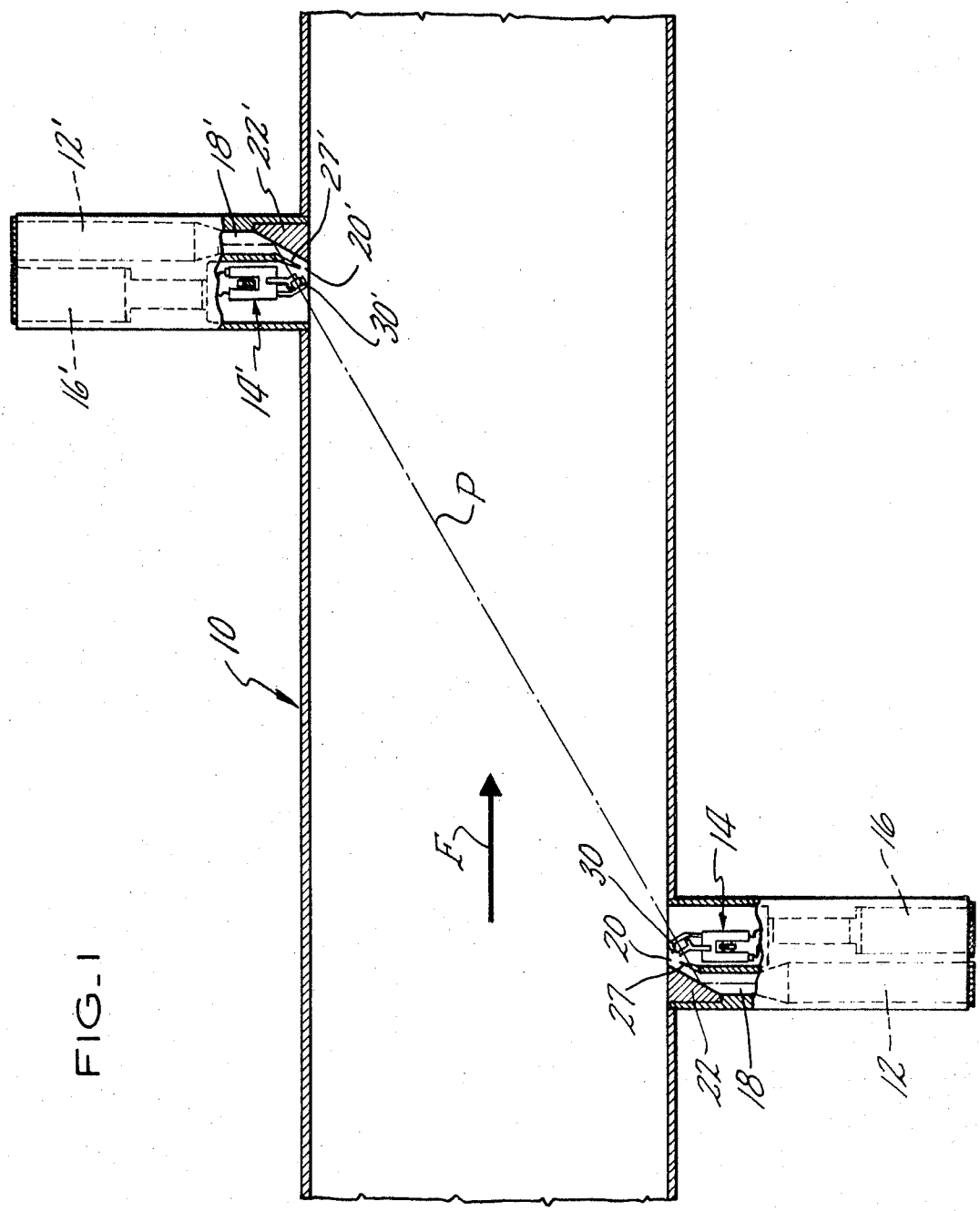
INVENTOR
E. MARSTON MOFFATT
BY
ATTORNEY Sept. 30, 1969    E. M. MOFFATT    3,469,445
GAS FLOW MEASURING SYSTEM
Filed July 20, 1967    2 Sheets-Sheet 2
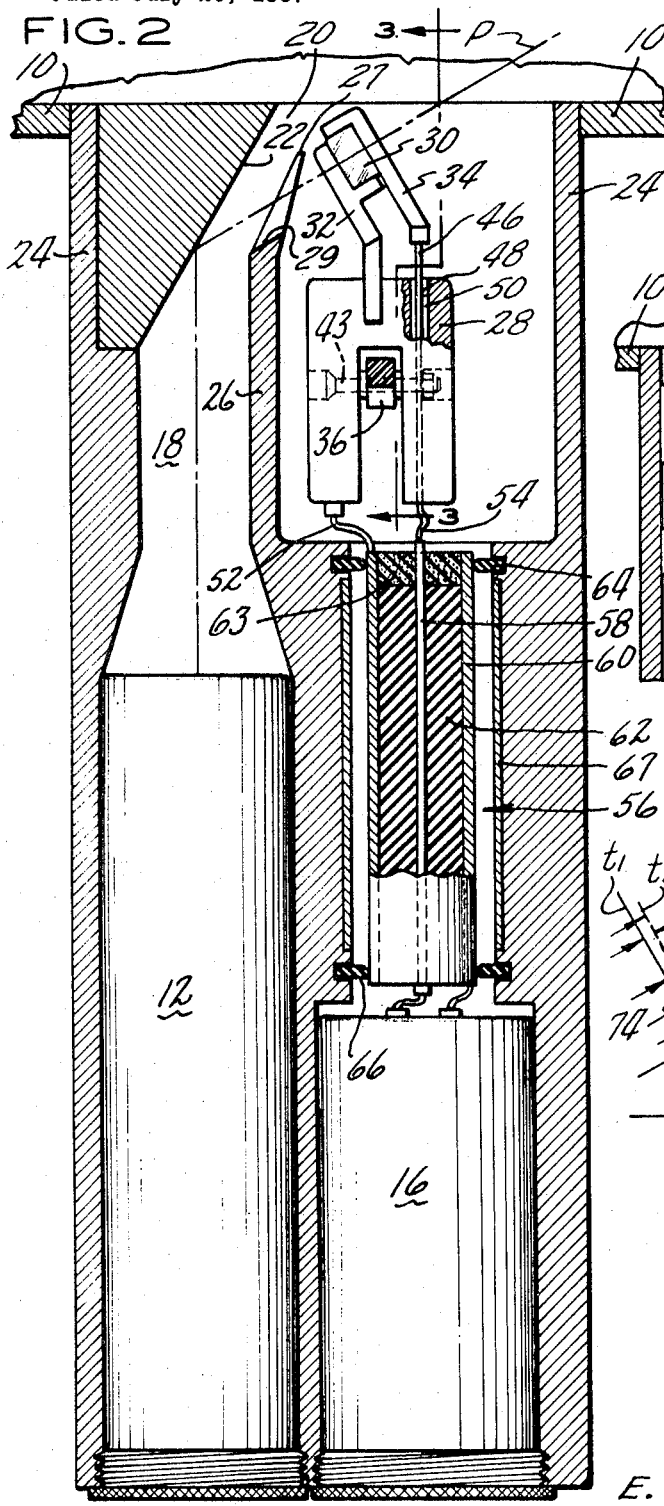
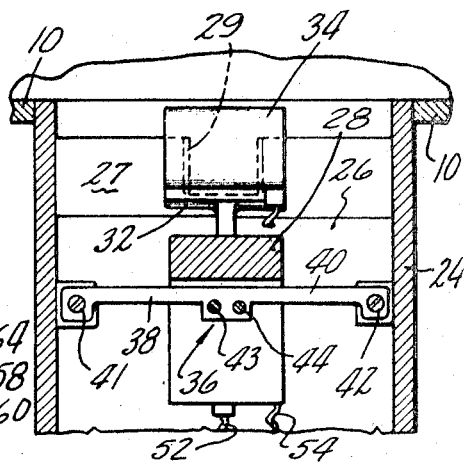
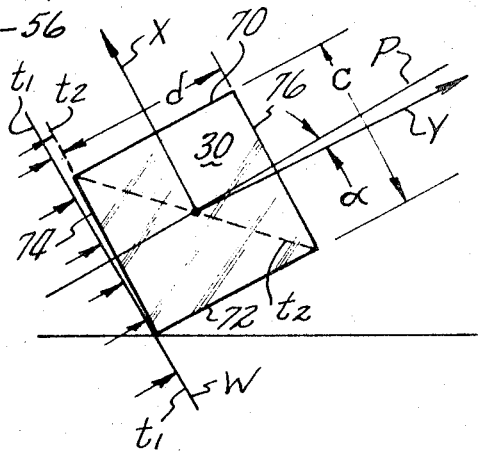
INVENTOR
E. MARSTON MOFFATT
BY
ATTORNEY 3,469,445
GAS FLOW MEASURING SYSTEM
Elbert Marston Moffatt, Glastonbury, Conn., assignor to United Aircraft Corporation, East Hartford, Conn., a corporation of Delaware
Filed July 20, 1967, Ser. No. 654,786
Int. Cl. G01f 1/02
U.S. Cl. 73—194                                            14 Claims

ABSTRACT OF THE DISCLOSURE

This disclosure relates to a system for measuring gas flow in a conduit by alternately sending shock pulses upstream and downstream in the flow and measuring the travel time for the pulses moving in each direction. For accuracy, a piezoelectric pulse detector which is energized by pulses moving both upstream and downstream is used at each end of the conduit. The detector is specially constructed to produce a large voltage signal with a short rise time.

BACKGROUND OF THE INVENTION

This invention relates to a system for measuring gas flow with shock pulses and the instruments necessary to accurately measure the travel time of the pulses in the gas flow.

One system of measuring gas flow in a conduit is to employ shock pulse generators which send pulses upstream and downstream in a fluid and timing mechanisms which determine the difference in travel time for each of the pulses. From this time difference, flow velocity or mass flow can be determined. In such systems it is desirable to employ a pulse detector at each end of the timing distance to be assured of a standard response to the pulses at each end of the distance rather than rely upon the shock pulse triggering signal to a pulse generator at one end and a pulse detection signal from a pulse sensor at the other end. It is also desirable that similarly constructed detectors be utilized at each end of the timing distance to standardize the response of the detectors each time a pulse passes a timing point. Errors in geometry and detection can be minimized in this manner. With the use of only two detectors for measuring pulses moving in different directions, it becomes important that a detector be employed which responds to pulses striking the detector from directions which are 180° apart.

Another problem which arises with systems detecting pulses in a gas is the failure of the detector to respond to a weak pulse. Piezoelectric crystals will produce a small voltage signal if excited by a pressure pulse, but the signal is very weak and amplifying the signal from the crystal will also amplify noise which may be sufficiently strong to obscure the pulse signal. Larger crystals can be used to produce stronger signals but as the thickness of the crystal is increased in the direction of the pulse traveling through it, the rise time for the crystal also increases. Short rise times are desired in order to keep the output of the detector properly synchronized with the impingement of a pulse front on the crystal regardless of the variation in the pulse strength. A strong pulse will produce a large crystal output with the same rise time as a weak pulse, but since the detection circuitry normally triggers a counter at a fixed voltage level, a stronger pulse would cause that voltage level to be reached before a weak pulse would. The magnitude of this deviation in triggering the counter due to variations in pulse strength can be minimized by keeping the rise time small. It is therefore desirable to keep the thickness of the crystal small in the direction of travel of the pulse and to find other ways to increase the output of the crystal.

SUMMARY OF THE INVENTION

In an effort to minimize the geometrical errors and detection errors, this invention employs two detectors of identical construction at each end of the timing distance over which shock pulses move in the upstream and downstream directions. Each of these detectors is connected to an electrical timing circuit to alternately start and stop the timer. By constructing each detector in the same fashion, a standard response to the pulses will be obtained. By using the same detectors for pulses traveling in opposite directions, the geometrical errors in the timing distance between the detectors will be minimized.

Each detector employs a piezoelectric crystal which is positioned adjacent to a shock pulse source on a path which is common to pulses moving both upstream and downstream. Since the detectors must sense pulses moving in each direction through the gas, each crystal must respond to pulses striking the detector from directions which are 180° apart.

Each crystal has two sensitive axes which are perpendicular to one another and to a third insensitive axis. Voltages are produced along the two sensitive axes in response to both shear and compression waves in the crystal generated by a shock pulse which strikes the crystal. It is a particular feature of this invention that the detector produces a large output signal in the form of a composite voltage representing both shear and compression caused by the shock pulses striking the crystal. The development of such a detector output is accomplished in part by interconnecting the electrodes which would separately yield shear and compression voltages. These electrodes are located on surfaces of the crystal which are energized by the shear waves and compression waves. In order to initiate both compression and shear waves in the crystal, the crystal is positioned with one of the sensitive axes at a slight angle to the path of the shock pulse which impinges upon the crystal and with the third insensitive axis normal to the path of the shock pulse. Consequently, the shock pulse will impinge upon the crystal at an angle and initiate both a shear wave and a compression wave.

Another feature of this invention is that the angle which one of the sensitive axes forms with the path of the shock pulse is selected to produce a maximum composite output in response to both the shear and compression waves. This angle is established as a function of the ratio of the velocity of the shock pulse in the gaseous medium and the velocity of the shock pulse in the crystal. The sine of this angle $\alpha$ for a rectangular crystal having dimensions $d$ and $c$ along the sensitive axes is:

$$\sin \alpha = \frac{V_g}{V_c} \frac{d}{c}$$

where $V_g$ is the velocity of the pulse in the gas and $V_c$ is the velocity of the pulse in the crystal. By positioning the crystal at this selected angle, the output of the detector can be increased without increasing the size of the crystal which would be accompanied by an undesirable increase in rise time.

Separate detectors are positioned adjacent to each of the shock pulse sources in order to detect the pulse and start the timer running. Because of the proximity of the pulse source, each detector is mechanically isolated from disturbances caused by shock pulses in the surrounding structure. In one embodiment, the crystal is supported in brackets which form common electrodes on two of the crystal surfaces to obtain the composite voltage and the large detector output. Since the bracket will cover surfaces of the crystal which must be energized by the shock pulse, the brackets are composed of a material having the same specific acoustical impedance as the crystal in order to transmit the shock pulse from the gaseous medium through the bracket to the crystal without attenuation and without creating reflected waves which would simply add noise to the voltage signal. In order to balance the strength of pulsses originating at the immediately adjacent source with that of pulses originating at the opposite source, a shield may be placed between the source and the immediately adjacent detector to diminish the pulse from the closer source.

BRIEF DESCRIPTION OF THE DRAWINGS

FIG. 1 is a view of the gas flow measuring system showing shock pulse generators and detectors located at two positions along a conduit.

FIG. 2 is a sectional view showing one of the detectors mounted in the wall of the conduit adjacent to a pulse source exit.

FIG. 3 is a detail at reduced scale showing the resilient mount as viewed along line 3—3 of FIG. 2.

FIG. 4 illustrates the manner in which a shock pulse energizes a piezoelectric crystal to produce an optimum output.

DESCRIPTION OF PREFERRED EMBODIMENT

With reference to FIG. 1, a conduit designated 10 carries a gas flow F, indicated by the arrow in a timing section of a conduit where the flow measurement will be made. Located at each end of the timing section are shock pulse sources 12 and 12' and shock pulse detectors 14 and 14'. Prime numbers designate corresponding parts of the downstream instrument. The shock pulse sources may be any suitable generator which will produce a sonic pressure pulse in a gaseous medium. Such a generator is disclosed in my copending application U.S. Ser. No. 631,009, filed Apr. 14 1967.

This system measures the gas flow in the conduit 10 by alternately sending shock pulses downstream with the flow from source 12 and upstream against the flow from source 12'. The differential in the travel times for each of the pulses is a measure of the gas flow. The pulses are directed along a common path P between the sources 12 and 12'. The detectors 14 and 14' are positioned on this path adjacent to each of the pulse sources. Each shock pulse will be sensed by the detectors as it moves through the flow gas toward the opposite source. A pulse moving downstream will first strike the detector 14 and produce a triggering signal which will energize a timer (not shown) through amplified 16. When the pulse moving downstream reaches the detector 14', a signal from this detector 14' will shut off the timer through amplifier 16'. In this manner, the time for the pulse to move with the gas flow over the fixed distance between the detectors can be determined. Once the travel time for a pulse moving downstream has been determined, a shock pulse originated from the downstream source 12' is sent upstream. The upstream-moving pulse will first strike detector 14' and the detector 14' will produce a trigger signal which will start the timer through amplifier 16'. When the pulse reaches the upstream detector 14, the timer will be shut off by a signal transmitted through amplifier 16. Once the travel times for both upstream-moving and downstream-moving pulses have been determined, it is possible to measure the flow velocity or the mass flow in the conduit.

Each of the shock pulse sources 12 and 12' directs a pulse outwardly through a nozzle 18 or 18' toward an exit 20 or 20' in the wall of the conduit. At each exit, however, a reflector 22 of 22' will change the direction of travel of the shock pulse and aim the pulse toward the detector at the opposite end of the conduit. These reflectors are positioned such that the pulses traveling in ether direction in the conduit traverse the common path P between the detectors 14 and 14'. In this manner, the distance traveled by each of the pulses between the detectors will be the same. Any errors in the distance traveled by each pulse before the pulse is detected will be limited to errors originating in the detector due to geometrical differences in the construction of each detector. It is therefore important that each of the detectors be constructed in the same manner with substantially the same dimensions.

With reference to FIG. 2, a sectional view of the shock pulse detector 14 and the nozzle 18 will be seen. The nozzle and the detector are mounted to the wall of the conduit 10 within a housing 24. Mounted in the exit 20 at the wall of the conduit 10 is the reflector 22. Interposed between the nozzle 18 and the detector 14 is a partition 26. This partition prevents shock pulses moving up the nozzle from entering the detector through the lower supporting structure for the detector before the pulse strikes the reflector 22 and is directed along the path P toward the opposite end of the conduit. The detector will not be energized until the pulse is moving along the path toward the opposite source. Since the shock pulses become weaker while moving through the gas, the strength of a pulse striking the detector 14 from the romote source 12' will be less than the strength of the pulse from the adjacent source 12. In order to equalize the pulse strengths at the detectors, regardless of the source from which the pulse approaches, a shield 27 is mounted on top of the partition 26 to reduce the strength of the pulse from the adjacent source. This shield 27 has a cutout 29 which allows a small portion of the pulse from the adjacent source to pass to the detector unobstructed.

The detector 14 is composed of a seismic mass 28, a crystal 30 and electrically conductive mounting brackets 32 and 34. The detector 14 is mounted to the housing 24 by means of a resilient support 36. The support 36 is seen in greater detail in FIG. 3 and includes arms 38 and 40 which may be bonded to the walls of the housing 24 or held by screws 41 and 42. The seismic mass 28 is attached to the support 36 by screws 43 and 44. The large inertia of the mass will tend to reduce the physical shock which the crystal 30 experiences when a shock pulse moves through the nozzle 18 or strikes the supporting structure from the conduit. In addition, the support 36 may be constructed of a material such as nylon which will add resiliency between the housing 24 and the mass 28 and at the same time attenuate any vibratory motions of the mass through the internal hysteresis of this material.

The heart of the detector 14 is the piezoelectric crystal 30 in FIG. 2. Piezoelectric crystals are well-known sensors of shock pulses and generate voltages on their surfaces when struck by a pulse. In order to utilize these voltages, the brackets 32 and 34 are electrically conductive and insulated from one another to serve as electrodes for transmitting the voltage signals from the crystal 30 to amplifier 16. Bracket 32 is mounted in the seismic mass 28 which may be an electrically conductive material such as brass. With the support 36 made of nylon, the mass 28 will be electrically insulated from the conduit and may operate above ground potential as a portion of the electrical connection to the amplifier 16.

Since the voltages produced by piezoelectric crystals are very small, and since very accurate voltage measurements must be made, the capacitive coupling between the leads from the crystal to the amplifier must be kept small and constant. To this end the brackets 32 and 34 are made sufficiently rigid to support the crystal with little deflection. An insulated electrical lead 46 from bracket 34 extends through a passageway 48 within the seismic mass 28 and is rigidly supported with respect to the mass 28 by means of a potting compound 50. In order to permit the detector to move resiliently, short flexible leads 52 and 54 connect the detector to a coaxial conductor 56 which leads to the amplifier 16. The conductor 56 consists of a central wire 58 and a cylindrical shell 60. The ratio of the diameter of the wire to the diameter of the shell is kept small to minimize the capacitance between the wire and shell. The seismic mass 28 is connected to the shell 60 by means of the flexible lead 52 and the central wire 58 is connected to the insulated electrical lead 46 by means of the flexible lead 54. The central wire 58 is insulated from and positioned within the shell 60 by means of a low dielectric foam potting 62. A pressure seal 63 closes the upper end of the shell 60 to prevent the pressure in the conduit from reaching the amplifier. A high pressure from the conduit could adversely affect the electrical elements in the amplifier. The coaxial conductor 56 is supported within the housing 24 on O-rings 64 and 66 which insulate the conductor from the housing. The conductor 56 is separated from the housing 24 elsewhere along its length by a small air gap. Such a construction permits both of the connections to the crystal to operate above ground potential which may be desirable if a boot-strap amplifier is employed to detect the crystal signal. An acoustic shield 67 lines the cavity through which the conductor 56 passes to attenuate the transmission of shock pulses to the conductor 56 from housing 24. The pulses moving through the housing 24 may cause small displacements of this shield 67 but because of the poor coupling through the air gap between shell 60 and shield 67, the pulses will not be transmitted to the shell 60. Shield 67 may also be electrically grounded to the amplifier to shield the conductor 56 electrically.

It is a particular feature of this invention that the piezoelectric crystal 30 be actuated to produce an optimum output. The manner in which this actuation is obtained from waves which impinge upon it from directions 180° apart is discussed in greater detail with respect to FIG. 4. The piezoelectric crystal 30 is made from quartz and is cut to a rectangular shape. Other crystals which exhibit the following properties may also be used. The crystal has three orthogonal axes which are associated with the voltages produced by the crystal in response to an impinging shock pulse. The two axes along which voltages are produced are labeled X and Y. The third axis is the Z axis which is normal to the plane of FIG. 4. The voltages produced by the crystal along the X and Y axes are respectively associated with compression or tension within the crystal and shear within the crystal although all modes of excitation may not be employed. For example, a compression pulse traveling through the crystal in the direction of the X axis will produce a voltage along the X axis. This voltage can be detected by electrical contacts connected to the surfaces 70 and 72. It is also a characteristic of this crystal that compression waves traveling through the crystal in the direction of the Y axis will produce a voltage along the X axis which is opposite in sign to the voltage produced by compression of the crystal along the X axis. It will, therefore, be understood that when this crystal is subjected to a hydrostatic pressure which sends pressure pulses along both the X and Y axes, the voltage output of the crystal along the X axis will be zero. The crystal is also responsive to shear about the Z axis. For example, shear about the Z axis occurs when force is applied in the diagonal directions as the crystal is viewed in FIG. 4. Pressure applied to one pair of diagonal corners will create a voltage along the Y axis. A corresponding pressure applied to the opposite pair of diagonal corners will produce an equal but opposite voltage along the Y axis. These voltages can be detected by electrical contacts connected to surfaces 74 and 76.

From the above, it will be understood that a pressure wave striking the crystal from path P at an angle to the Y axis will initiate both a shear wave and compression wave traveling through the crystal with a resulting voltage output along both the X axis and the Y axis. These voltages can be detected by applying electrodes to the surfaces 70, 72, 74 and 76.

A shock pulse which impinges upon the crystal at a small angle, is indicated by the letter W. This shock pulse is shown striking the crystal at a time $t_1$. At time $t_2$ the shock wave has traveled a finite distance through the gaseous medium in which the crystal is mounted. The position at time $t_2$ is indicated at the slightly advanced position in the figure. The wave has also advanced into the crystal at a slight angle to the path P between the shock pulse sources as indicated by the dashed diagonal line. This is similar to the refraction of light passing from one medium to another and is due to the fact that the speed of the pulse is greater in the crystal than in the gaseous medium. The pulse has traveled completely through the crystal at surface 72 while the pulse is just entering the crystal at surface 70. With the pulse in this particular position, an output will be observed on both the X axis responsive to compression and the Y axis responsive to shear. A calculation of the angle of incidence which will result in this positioning of the shock pulse within the crystal will show that the sine of this angle $\alpha$ is expressed by the following formula:

$$\sin \alpha = \frac{V_x}{V_o} \frac{d}{c}$$

where $d$ and $c$ are the dimensions of the crystal as indicated in FIG. 4. For a quartz crystal operating in an environment of natural gas, and with a crystal having a $c$-dimension of .09 inch and a $d$-dimension of .06 inch, $\alpha$ is approximately equal to 3°.

It has been found from experiment that the output of the crystal with interconnected electrodes when struck at the angle of 3° will be two times greater than the output when the pulse of the same strength strikes the crystal directly along either the X or Y axes. The rise time remains the same. Direct impingement along the axes $\alpha=0°$, yields a simple compression wave in the crystal and no shear output, consequently a smaller combined output from the electrodes. Increasing $\alpha$ up to 10° also yields an output larger than an $\alpha=0°$ apparently due to the presence of both shear and compression waves, but output drops off rapidly below the 3° angle. The formula for $\sin \alpha$, therefore, represents the approximate angle at which the shock pulse should strike the crystal to produce the optimum output.

It is important, of course, that the proper pair of crystal electrodes be connected together. For example, the positively charged surfaces normal to both the X and Y axes when the pressure wave strikes the crystal should be connected together and the negatively charged surfaces normal to the X and Y axes should be connected together. If the shock pulse were to strike the edge of the crystal common to surfaces 70 and 74, the shear wave would produce a voltage exactly the opposite of that produced along the Y axis by the shock pulse indicated in FIG. 4. If the crystal were so oriented that such a pressure wave were to strike the edge of the crystal common to surfaces 70 and 74, $\alpha=-3°$, maximum output could be obtained by mating the electrodes on surfaces 70 and 74 and mating the electrodes on surfaces 72 and 76. Without remating the surfaces the voltages from compression and shear would be out of phase and the composite output would be essentially zero.

It is important to note that the surfaces which should be mated for proper phasing of voltages are the same for pulses striking the crystal from either direction along the path P. This is due to the fact that hear wave in the crystal creates the same distortion internally when the diagonally opposite corner is struck by the wave. The response of the crystal will be the same, therefore, for waves impinging upon the crystal from directions which are 180° apart. This makes the adaptation of the crystal using a pair of interconnected electrodes particularly advantageous where the crystal is actuated by pulses striking the crystal from directions which are 180° apart. In order to develop a maximum output from the crystal for these pulses, it is simply necessary to orient the crystal with the Z axis normal to the path and with the X and Y axes positioned at the angle of optimum voltage output for the paired electrodes.

With reference again to FIG. 2, it will be noted that the electrically conductive brackets 32 and 34 are in contact with adjacent surfaces of the crystal which are normal to the sensitive axes X and Y. The brackets 32 and 34 form the electrodes common to the pairs of crystal surfaces which should be mated for optimum output. In order to insure that a maximum pulse strength will reach the crystal, the brackets may be constructed of a material such as aluminum if a quartz crystal is used. Aluminum and quartz have approximately the same specific acoustical impedance and therefore no reflective waves will be generated at the interface of the crystal and the brackets when a pressure wave strikes the detector. It is also advantageous to add a film of liquid such as silicone oil between the crystal and the bracket interface to improve the transfer of acoustic energy. Silicone oil is desirable because its low vapor pressure retards evaporation.

The brackets support the crystal at the angle $\alpha$ to the path P to produce the optimum output as described with respect to FIG. 4. In addition, since the travel time for the pulses through each detector will be affected by the thickness of the brackets and the crystal along the path P, each bracket and crystal should be constructed as uniformly as possible in order to standardize the travel time of each pulse in each detector.

I claim:
1. A detector for a shock pulse traveling through a medium along a selected path comprising:
 (a) a piezoelectric crystal having first, second and third orthogonal axes, a voltage being produced along the first axis in response to compression in the crystal caused by a pulse moving normal to the third axis, and a voltage being produced along the second axis in response to shear in the crystal caused by a pulse moving normal to the third axis;
 (b) means for supporting the crystal in the path of the pulse with the third axis normal to the path; and
 (c) means for sensing the voltages produced along both first and second axes when the crystal is struck by a pulse traveling along the selected path.

2. Apparatus according to claim 1 wherein the second axis is positioned at a small angle to the path, the angle being a function of the ratio of the velocity of the pulse in the medium and the velocity of the pulse in the crystal.

3. Apparatus for detecting a sonic pulse moving in a medium comprising:
 (a) a rectangular piezoelectric crystal having first pair of oppositely disposed crystal surfaces producing a voltage proportional to compression in the crystal caused by the sonic pulse, second pair of oppositely disposed crystal surfaces producing a voltage proportional to shear in the crystal caused by the pulse, the crystal being adapted to be positioned with the second pair of crystal surfaces forming an angle with the pulse front, the angle being selected as a function of the ratio of the velocity of the pulse in the medium in the crystal and a third pair of oppositely disposed crystal surfaces normal to the pulse front;
 (b) a first electrode on one of the crystal surfaces of each of the voltage-producing pairs; and
 (c) a second electrode on the other of the crystal surfaces of each of the voltage-producing pairs, each second electrode being connected to the first electrode of the other voltage-producing pair, whereby the voltage signal from the electrodes is a composite voltage of the compression and shear in the crystal.

4. In apparatus for measuring gas flow in a conduit having a pressure pulse source located at each end of a section of the conduit for directing pressure pulses along a selected path between the sources at opposite ends of the section, a pulse detector located adjacent to each of the pulse sources and between the sources for measuring the travel time of each pulse moving between the ends of the section and having a piezoelectric crystal positioned on the pulse path with a sensitive axis placed substantially parallel to the path of the pulse whereby the pressure pulses impinge upon each detector from directions which are 180° apart and energize the crystal.

5. Apparatus according to claim 4 wherein a shield is positioned between each source and the adjacent detector to attenuate the strength of the pulse energizing the crystal from the one of the directions which are 180° apart.

6. Apparatus according to claim 4 wherein the crystal is resiliently supported from the conduit by a shock mount which is electrically conductive to form one of the electrical contacts for the crystal.

7. In a system for measuring gas flow in a section of a conduit by timing shock pulses moving alternately upstream and downstream along a common path in the flow, a pulse detector located near each end of the section for determining the travel time of each pulse through the section and comprising:
 a piezoelectric crystal positioned on the common path and having first and second sensitive axes along which voltage signals are developed in response to the shock pulses and a third insensitive axis normal to the first and second axes, the first sensitive axis forming a small angle with the path, the angle between the first sensitive axis and the path being a function of the ratio of the velocity of the pulse in the gas and the velocity of the pulse in the crystal, and the third insensitive axis being normal to the path.

8. Apparatus according to claim 7 wherein:
 (a) the crystal is a rectangular quartz crystal having the three axes normal to the crystal surfaces and having a thickness $d$ along the first sensitive axis and a thickness $c$ along the second sensitive axis; and
 (b) the sine of the angle is equal to $$\frac{V_g}{V_c}\frac{d}{c}$$

where $V_g$ and $V_c$ are the velocities of the pulse in the gas and the crystal respectively.

9. Apparatus according to claim 7 wherein:
 (a) the piezoelectric crystal is a rectangular crystal having the second sensitive axis normal to the first sensitive axis and the third insensitive axis, each axis being normal to a pair of oppositely disposed crystal surfaces; and
 (b) the crystal is supported in the path of the pulse by a pair of electrically conductive brackets having the same specific acoustical impedance as the crystal, each bracket covering two different and adjacent sides of the crystal normal to the sensitive axes whereby the crystal signal derived through the brackets is a compositive of the signals generated along the two sensitive axes.

10. Apparatus according to claim 9 wherein one of the brackets supporting the crystal is mounted in a resiliently supported seismic mass to isolate the crystal from vibrations.

11. A system for measuring gas flow in a conduit comprising:
 (a) a shock pulse source located at each end of a section of the conduit for generating and directing shock pulses alternately back and forth through the flowing gas along a path between the sources;
 (b) a shock pulse detector positioned adjacent to each source and intersecting the path of the pulses between the sources for measuring the difference in travel time for each pulse in the flowing gas, each detector comprising:
  (1) a piezoelectric crystal having first, second and third orthogonal axes and a pair of oppositely disposed surfaces perpendicular to each of the first and second axis, one of the pairs of surfaces developing a voltage differential representing shear forces in the crystal operating about the third axis, the other of the pairs of surfaces developing a voltage differential representing compressive forces along the first and second axes, the third axis being positioned perpendicular to the pulse path between the pulse sources, and (2) an electrode on each of said crystal surfaces, one electrode of the one pair of surfaces being electrically joined to one electrode of the other pair of surfaces and the other electrode of the one pair of surfaces being electrically joined to the other electrode of the other pair of surfaces whereby a voltage composite of the shear and compressive forces on the crystal is developed each time a pulse passes through the detector.

12. A system according to claim 11 wherein one sensitive axis is positioned at a small angle to the path between the sources, the sine of the angle being a function of the pulse velocities in the gas and the crystal.

13. A system according to claim 12 wherein:
   (a) the crystal is mounted adjacent to the pulse source by a resiliently supported mass to damp the transmission of vibrations to the crystal from the pulse source; and
   (b) an apertured shield is positioned between the pulse source and the adjacent crystal to reduce the strength of the pulse exciting the adjacent crystal.

14. A system for measuring gas flow in a section of a conduit by timing shock pulses moving alternately upstream and downstream in the flow comprising:
   (a) a shock pulse source at each end of the section, each source having an exit into the conduit;
   (b) a reflector mounted in the exit of each source for directing shock pulses along a common path between the sources;
   (c) a detector adjacent to the exit of each source for timing the pulses moving alternately upstream and downstream along the path, each detector including:
      (1) a piezoelectric crystal having a first signal generating axis perpendicular to a second signal generating axis, a third axis perpendicular to the first and second axis and a rectangular cross section formed by pairs of oppositely disposed crystal surfaces normal to each of the signal-generating axes, a signal being generated along the first axis in response to shear in the crystal about the third axis and a signal being generated along the second axis in response to compression of the crystal along the first and second axes, the crystal being mounted on the path between the sources with the third of the axes positioned perpendicular to the path and one of the other of the axes positioned at an angle to the path, the angle being a function of the ratio of the speeds of the shock pulse in the gas and the crystal; and
      (2) an electrode on each of said crystal surfaces for sensing the voltage developed along each of the signal-generating axes, the positive and negative electrodes on one pair of oppositely disposed surfaces being electrically connected respectively to the positive and negative electrodes on the other pair of oppositely disposed surfaces.

References Cited

UNITED STATES PATENTS

| | | | |
|---|---|---|---|
| 2,413,462 | 12/1946 | Massa. | |
| 2,758,663 | 8/1956 | Snavely | 73—194 |
| 2,949,772 | 8/1960 | Kritz | 73—194 |
| 3,230,766 | 1/1966 | Kallmann | 73—194 |
| 3,402,306 | 9/1968 | Cary et al. | 310—8.8 XR |

CHARLES A. RUEHL, Primary Examiner

U.S. Cl. X.R.

310—9.8